US008343900B2

(12) United States Patent
Visger et al.

(10) Patent No.: US 8,343,900 B2
(45) Date of Patent: Jan. 1, 2013

(54) POLYMERS AND METHODS OF CONTROLLING VISCOSITY

(75) Inventors: Daniel C. Visger, Mentor, OH (US);
Marina Baum, Chagrin Falls, OH (US);
Calvin A. James, Madison, OH (US);
Bryan A. Grisso, Wickliffe, OH (US);
Mark R. Baker, Lyndhurst, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 710 days.

(21) Appl. No.: 12/299,564

(22) PCT Filed: May 7, 2007

(86) PCT No.: PCT/US2007/068346
§ 371 (c)(1),
(2), (4) Date: May 4, 2009

(87) PCT Pub. No.: WO2007/133999
PCT Pub. Date: Nov. 22, 2007

(65) Prior Publication Data
US 2009/0221461 A1 Sep. 3, 2009

Related U.S. Application Data

(60) Provisional application No. 60/746,689, filed on May 8, 2006.

(51) Int. Cl.
*C10M 149/04* (2006.01)
*C10M 133/06* (2006.01)

(52) U.S. Cl. ........................................ 508/471; 508/545
(58) Field of Classification Search ................. 508/471, 508/545
See application file for complete search history.

(56) References Cited

U.S. PATENT DOCUMENTS

| 4,882,034 A | * | 11/1989 | Tack et al. | ........................ 208/15 |
| 4,973,733 A | * | 11/1990 | Valkovich et al. | .............. 560/24 |
| 5,763,374 A | | 6/1998 | Sakai et al. | |
| 6,174,843 B1 | * | 1/2001 | Peyton et al. | .................. 508/468 |
| 6,746,993 B2 | | 6/2004 | Yuki et al. | |
| 2003/0036488 A1 | * | 2/2003 | Yuki et al. | ...................... 508/469 |
| 2004/0077509 A1 | | 4/2004 | Yuki et al. | |

OTHER PUBLICATIONS

Search Report from corresponding PCT Publication No. WO 2007/133999 A3 dated Feb. 7, 2008.
Written Opinion from corresponding international Application No. PCT/US2007/068346 dated Nov. 15, 2007.

* cited by examiner

*Primary Examiner* — Jim Goloboy
(74) *Attorney, Agent, or Firm* — David M. Shold; Christopher D. Hilker

(57) ABSTRACT

The present invention relates to a novel polymer with pendant groups. The invention further provides for a lubricating composition containing said polymer. The invention further provides a method and use of controlling viscosity index by supplying to an oil of lubricating viscosity the polymer with pendant groups.

20 Claims, No Drawings

POLYMERS AND METHODS OF CONTROLLING VISCOSITY

FIELD OF INVENTION

The present invention relates to a novel polymer with pendant groups. The invention further provides for a lubricating composition containing said polymer. The invention further provides a method and use of controlling viscosity index by supplying to an oil of lubricating viscosity the polymer with pendant groups.

BACKGROUND OF THE INVENTION

Viscosity index improvers are known to be added to lubricating oil compositions to improve the viscosity index of the lubricant. Typical viscosity index improvers include polymers of methacrylates, acrylates, olefins, or maleic-anhydride styrene copolymers and esterified derivatives thereof. The viscosity index improvers tend to incorporate ester functional groups in pendant/grafted/branched groups. The ester functional groups may be derived from linear alkyl alcohols with 1 to 40 carbon atoms. Recent attempts have been made to produce viscosity index improvers where the ester functional groups have a degree of branching. However, such viscosity index improvers have poor shear stability, viscosity index control and low temperature viscosity.

U.S. Pat. No. 6,746,993 discloses a viscosity index improver defined as a polymer with a solubility parameter of 8.6-9.4, a crystallisation temperature of −15° C., or less and a steric hindrance factor of 0 to 13. The polymer comprises alkyl alkenyl ethers and $C_{1-40}$ alkyl methacrylates, of which some may be β-branched. The viscosity index improver is suitable for gear oils, hydraulic fluids, automatic transmissions and engine oils.

U.S. Pat. No. 5,763,374 discloses lubricating oil compositions containing a copolymer composed of 20-70% of alkyl acrylates, 30-80% alkyl methacrylates. The lubricating oil may be a gear oil or an engine lubricant.

US Patent Application 2004/0077509 discloses a viscosity index improver polymer suitable for gear oils, transmissions, traction oils, hydraulic oil and engine oils. Further the polymer provides an improved shear stability and low temperature viscosity. The polymer is composed of (meth)acrylates derived from branched alcohols. The branched ester groups contain $C_{18-36}$ alkyl groups, with the proviso that the group does not contain a methylene group containing more than 16 carbon atoms. The polymer further contains 5-90% of either a $C_{8-17}$ alkyl (meth)acrylate or $C_{18-24}$ alkyl (meth)acrylate; and 5-50% of a hydroxy, or amide or carboxyl containing monomer. The monomer with branched ester groups may be present at 5 to 90%, or to 70% or 20 to 60%.

Given the performance of the viscosity index improvers of the prior art, it would be desirable to have a polymer and lubricating compositions thereof capable of providing acceptable/improved shear stability, viscosity index control and low temperature viscosity. The present invention provides such a polymer and lubricating compositions thereof.

SUMMARY OF THE INVENTION

The present invention in one embodiment provides a polymer of Formula (I), wherein the polymer has pendant groups as represented within $(\ )_w$ of the formula:

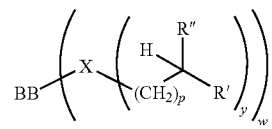

Formula (I)

wherein
BB is a polymer backbone with one or more pendant groups;
X is a functional group which either (i) contains a carbon and at least one oxygen or nitrogen atom or (ii) is an alkylene group with 1 to 5 carbon atoms (typically —$CH_2$—), connecting the polymer backbone and a branched hydrocarbyl group contained within $(\ )_y$;
w is the number of pendant groups attached to the polymer backbone in the range of 1 to 2000, or 1 to 500, or 5 to 250;
y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal (typically formed during neutralization of ester reactions. Suitable metals include calcium, magnesium, barium, zinc, sodium, potassium or lithium) or ammonium cation, and mixtures thereof;
p is an integer in the range of 1 to 15 (or 1 to 8, or 1 to 4);
R' and R" are independently linear or branched hydrocarbyl groups, and the combined total number of carbon atoms present in R' and R" is at least 12 (or at least 16, or at least 18 or at least 20); and with the proviso that when the polymer comprises a poly (meth)acrylate with both R' and R" being linear, then for greater than 70% (including 72% or more, 75% or more, 80% or more or 85% or more) of the branched hydrocarbyl groups as represented within $(\ )_y$ both R' and R" are linear groups.

The present invention in one embodiment provides a polymer of Formula (I), wherein the polymer has pendant groups as represented within $(\ )_w$ of the formula:

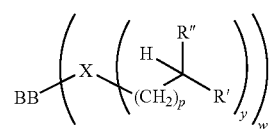

Formula (I)

wherein
BB is a polymer backbone with one or more pendant groups;
X is a functional group which either (i) contains a carbon and at least one oxygen or nitrogen atom or (ii) is an alkylene group with 1 to 5 carbon atoms (typically —$CH_2$—), connecting the polymer backbone and a branched hydrocarbyl group contained within $(\ )_y$;
w is the number of pendant groups attached to the polymer backbone in the range of 1 to 2000, or 1 to 500, or 5 to 250;
y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal or ammonium cation, and mixtures thereof;

p is an integer in the range of 1 to 15 (or 1 to 8, or 1 to 4);
R' and R" are independently linear or branched hydrocarbyl groups, and the combined total number of carbon atoms present in R' and R" is at least 12 (or at least 16, or at least 18 or at least 20); and with the proviso that when the polymer comprises a poly(meth)acrylate with both R' and R" being linear, then greater than 70% to less than 90% (including 72% to 89%) and greater than 90% to 100% of the branched hydrocarbyl groups as represented within ( )$_y$ both R' and R" are linear groups.

The present invention in one embodiment provides a polymer of Formula (I), wherein the polymer has pendant groups as represented within ( )$_w$ of the formula:

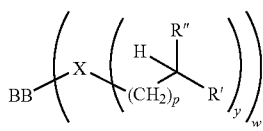

Formula (I)

wherein
BB is a polymer backbone with one or more pendant groups;
X is a functional group which either (i) contains a carbon and at least one oxygen or nitrogen atom or (ii) is an alkylene group with 1 to 5 carbon atoms (typically —CH$_2$—), connecting the polymer backbone and a branched hydrocarbyl group contained within ( )$_y$;
w is the number of pendant groups attached to the polymer backbone in the range of 1 to 2000, or 1 to 500, or 5 to 250;
y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal or ammonium cation, and mixtures thereof;
p is an integer in the range of 1 to 15 (or 1 to 8, or 1 to 4);
R' and R" are independently linear or branched hydrocarbyl groups, and the combined total number of carbon atoms present in R' and R" is at least 12 (or at least 16, or at least 18 or at least 20); and with the proviso that when the polymer comprises a poly(meth)acrylate with both R' and R" being linear, then for greater than 70% but excluding 90% of the branched hydrocarbyl groups as represented within ( )$_y$ both R' and R" are linear groups.

The present invention in one embodiment provides a polymer of Formula (I), wherein the polymer has pendant groups as represented within ( )$_w$ of the formula:

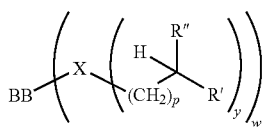

Formula (I)

wherein
BB is a polymer backbone with one or more pendant groups;
X is a functional group which either (i) contains a carbon and at least one oxygen or nitrogen atom or (ii) is an alkylene group with 1 to 5 carbon atoms (typically —CH$_2$—), connecting the polymer backbone and a branched hydrocarbyl group contained within ( )$_y$;
w is the number of pendant groups attached to the polymer backbone in the range of 1 to 2000, or 1 to 500, or 5 to 250;
y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal or ammonium cation, and mixtures thereof;
p is an integer in the range of 1 to 15 (or 1 to 8, or 1 to 4);
R' and R" are independently linear or branched hydrocarbyl groups, and the combined total number of carbon atoms present in R' and R" is at least 12 (or at least 16, or at least 18 or at least 20); and with the proviso that when the polymer comprises a poly(meth)acrylate with both R' and R" being linear, then greater than 90% of the branched hydrocarbyl groups as represented within ( )$_y$ contain linear groups on both R' and R".

The present invention in one embodiment provides a polymer of Formula (I), wherein the polymer has pendant groups as represented within ( )$_w$ of the formula:

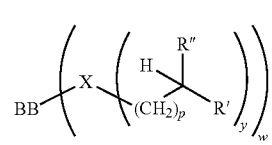

Formula (I)

wherein
BB is a polymer backbone with one or more pendant groups;
X is a functional group which contains a carbon and at least one oxygen or nitrogen atom, connecting the polymer backbone and a branched hydrocarbyl group contained within ( )$_y$;
w is the number of pendant groups attached to the polymer backbone in the range of 1 to 2000, or 1 to 500, or 5 to 250;
y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal or ammonium cation, and mixtures thereof;
p is an integer in the range of 1 to 15 (or 1 to 8, or 1 to 4);
R' and R" are independently linear or branched hydrocarbyl groups, and the combined total number of carbon atoms present in R' and R" is at least 12 (or at least 16, or at least 18 or at least 20); and with the proviso that when the polymer comprises a poly(meth)acrylate with both R' and R" being linear, then for greater than 70% (including 72% or more, 75% or more, 80% or more or 85% or more) of the branched hydrocarbyl groups as represented within ( )$_y$ both R' and R" are linear groups.

In one embodiment when the polymer with pendant groups as defined above comprises a poly(meth)acrylate, the pendant groups, have an average steric hindrance factor (defined below) greater than 13.

In one embodiment the invention provides a lubricant composition comprising (a) an oil of lubricating viscosity, and (b) a polymer with pendant groups as defined above.

In one embodiment the invention provides a lubricant or lubricant concentrate obtained (or obtainable) by admixing the polymer of the invention with an oil of lubricating viscosity.

In one embodiment the invention provides a method of controlling the viscosity index of a lubricant, the method comprising supplying to the lubricant a polymer with pendant groups (which may also be referred to as a viscosity index improver), wherein the polymer with pendant groups is defined above.

In one embodiment the invention provides a method of controlling the viscosity index of a lubricant, the method comprising supplying to the lubricant a polymer with pendant groups (which may also be referred to as a viscosity index improver), wherein the polymer with pendant groups is defined above; and wherein the polymer with pendant groups has an average steric hindrance factor of greater than zero, with the proviso that when the polymer comprises a poly(meth)acrylate, the average steric hindrance factor is greater than 13.

In one embodiment the invention provides for the use of the polymer with pendant groups described herein to provide to a lubricant composition at least one (or at least two, or all) of acceptable/improved shear stability, acceptable/improved viscosity index control and acceptable/improved low temperature viscosity.

DETAILED DESCRIPTION OF THE INVENTION

The present invention provides a polymer with pendant groups, lubricants containing said polymer and a method of controlling the viscosity index of a lubricant In one embodiment the steric hindrance factor F used herein may be defined by the equation:

$$F=4U+Y$$

wherein F is the steric hindrance factor; U and Y represent the total atom numbers at the 6th position and the 7th position, respectively, in the side chain(s), counted from the backbone. A more detailed discussion on how to calculate the steric hindrance factor is given in U.S. Pat. No. 6,746,993, column 10, line 3 to column 11, line 3.

In different embodiments the polymer with pendant groups has a steric hindrance factor of one or more, or one to 30.

As used herein the term poly(meth)acrylate includes both a polymethacrylate and a polyacrylate.

For a polymer with pendant groups other than a poly(meth)acrylate, the steric hindrance factor may range 0 to 30 or 2 to 20.

For a poly(meth)acrylate polymer, the steric hindrance factor may be in the range of greater than 13 to 30, or 20 to 30, or 25 to 30.

In different embodiments a polymer (other than a poly(meth)acrylate) with pendant groups may contain 20% to 100%, or 50% to 100%, or 70% to 100%, of 85% to 100% branched hydrocarbyl groups represented by a group within ( )$_y$ of the formula above.

All of the polymer with pendant groups of the invention may contain 92% to 100% or less, or 95% to 100% or less, branched hydrocarbyl groups represented by a group within ( )$_y$ of the formula above.

The poly(meth)acrylate in different embodiments may contain 92% to 100% or less, or 95% to 100% or less, branched hydrocarbyl groups represented by a group within ( )$_y$ of the formula above.

In different embodiments the functional groups defined by X on the formula above, may comprise at least one of —$CO_2$—, —C(O)N= or —$(CH_2)_v$, wherein v is an integer in the range of 1 to 20, or 1 to 10, or 1 to 2.

In one embodiment X is derived from a carboxylic monomer. Examples of a suitable carboxylic monomer typically include maleic anhydride, maleic acid, (meth)acrylic acid, itaconic anhydride or itaconic acid. In one embodiment the carboxylic monomer may be at least one of maleic anhydride or maleic acid.

In one embodiment X is other than an alkylene group, connecting the polymer backbone and the branched hydrocarbyl groups.

In different embodiments the pendant groups may be esterified, amidated or imidated functional groups.

In one embodiment the pendant groups may be derived from esterified and/or amidated functional groups.

In one embodiment the polymer comprises esterified pendant groups.

Examples of suitable groups for R' and R" on the formula defined above include the following:

1) alkyl groups containing $C_{15-16}$ polymethylene groups, such as 1-$C_{1-15}$alkyl-hexadecyl groups (e.g. 1-octylhexadecyl) and 2-alkyl-octadecyl groups (e.g. 2-ethyloctadecyl, 2-tetradecyl-octadecyl and 2-hexadecyloctadecyl);

2) alkyl groups containing $C_{13-14}$polymethylene group, such as 1-$C_{1-15}$alkyl-tetradecyl groups (e.g. 1-hexyltetradecyl, 1-decyltetradecyl and 1-undecyltridecyl) and 2-$C_{1-15}$ alkyl-hexadecyl groups (e.g. 2-ethyl-hexadecyl and 2-dodecylhexadecyl);

3) alkyl groups containing $C_{10-12}$polymethylene group, such as 1-$C_{1-15}$alkyl-dodecyl groups (e.g. 1-octyldodecyl) and 2-$C_{1-15}$alkyl-dodecyl groups (2-hexyldodecyl and 2-octyldodecyl), 2-$C_{1-15}$alkyl-tetradecyl groups (e.g. 2-hexyltetradecyl and 2-decyltetradecyl);

4) alkyl groups containing $C_{6-9}$polymethylene group, such as 2-$C_{1-15}$ alkyl-decyl groups (e.g. 2-octyldecyl and 2,4-di-$C_{1-15}$ alkyl-decyl groups (e.g. 2-ethyl-4-butyl-decyl group);

5) alkyl groups containing $C_{1-5}$polymethylene group, such as 2-(3-methylhexyl)-7-methyl-decyl and 2-(1,4,4-trimethylbutyl)-5,7,7-trimethyl-octyl groups; and 6) and mixtures of two or more branched alkyl groups, such as alkyl residues of oxoalcohols corresponding to propylene oligomers (from hexamer to undecamer), ethylene/propylene (molar ratio 16:1-1:11) oligomers, iso-butene oligomers (from pentamer to octamer), $C_{5-17}$ α-olefin oligomers (from dimer to hexamer).

The pendant groups may contain a total combined number of carbon atoms on R' and R" in the range of 12 to 60, or 14 to 50, or 16 to 40, or 18 to 40, or 20 to 36.

Each of R' and R" may contain 5 to 25, or 8 to 32, or 10 to 18 methylene carbon atoms. In one embodiment the number of carbon atoms on each R' and R" group comprises 10 to 24.

Examples of suitable monomers capable of forming the pendant group include branched alkyl methacrylates such as 2-octyldodecyl and 2-decyltetradecyl methacrylates, and 2-tetradecyloctadecyl, 2-hexyl-dodecyl, 2-hexyltetradecyl, 2-ethylhexadecyl, 2-dodecylhexadecyl, 2-octyldodecyloxyethyl and 2-decyltetradecyl-oxyethyl methacrylates. In one embodiment the pendant group includes branched alkyl acrylates that are the same as those listed above for the corresponding methacrylates, such as 2-octyldodecyl acrylate or 2-decyltetradecyl acrylate.

The polymer with pendant groups may be amidated with amines including 2-decyl-tetradecylamine, 2-tetradecyl-octadecylamine, 2-methyl-ethylamine, or mixtures thereof.

The polymer with pendant groups may have a weight average molecular weight in the range of 1000 to 2,000,000, or 4000 to 1,000,000, or 6000 to 100,000, or 7,000 to 80,000.

Typically the polydispersity of the polymer with pendant groups may be in the range of 1 to 5, or 1.5 to 4.

As described hereinafter the molecular weight of the viscosity modifier may be determined using known methods, such as GPC analysis using polystyrene standards.

The polymer with pendant groups may be a homopolymer or a copolymer.

The polymer with pendant groups may have a linear, comb, cross-linked or star architecture.

In different embodiments the polymer with pendant groups comprises a polymethacrylate composed of 75 wt % or more, or 85 wt % or more, or greater than 90 wt % or more, or 92 wt % or more of methacrylate repeat units.

In different embodiments, when the polymer with pendant groups comprises a polymethacrylate, the polymethacrylate may contain 0 wt % to less than 20 wt %, or 0 wt % to 10 wt %, or 0 wt % to 5 wt %, or 0 wt % of alkyl acrylate repeat units.

In different embodiments, when the polymer with pendant groups comprises a poly(meth)acrylate, the polymethacrylate may contain 0 wt % to less than 20 wt %, or 0 wt % to 10 wt %, or 0 wt % to 5 wt %, or 0 wt % of methyl methacrylate repeat units.

Polymer Backbone

The polymer with pendant groups has a polymer backbone (BB in the formula above) where the variable BB typically only encompasses a carbon chain. Other functional groups, such as carboxylic groups, esters, amines, amides, imides, and the like are considered part of pendant groups.

The polymer with pendant groups may comprise at least one polymer backbone (BB in the formula above) composed of at least one of (a) a polymer derived from monomers comprising: (i) a vinyl aromatic monomer; and (ii) a carboxylic monomer (typically maleic anhydride, maleic acid, (meth) acrylic acid, itaconic anhydride or itaconic acid) or derivatives thereof; (b) a poly(meth)acrylate; (c) a functionalised polyolefin; (d) an ethylene vinyl acetate copolymer; (e) a fumarate copolymer; (f) a copolymer derived from (i) an α-olefin and (ii) a carboxylic monomer (typically maleic anhydride, maleic acid, (meth)acrylic acid, itaconic anhydride or itaconic acid) or derivatives thereof; or (g) mixtures thereof. In one embodiment the polymer with pendant groups comprises a polymethacrylate.

The carboxylic monomer may be an acid or anhydride or derivatives thereof that may be wholly esterified, partially esterified or mixtures thereof. When partially esterified other functional groups include acids, salts or mixtures thereof. Suitable salts include alkali metals, alkaline earth metals or mixtures thereof. The salts include lithium, sodium, potassium, magnesium, calcium or mixtures thereof. The unsaturated carboxylic acid or derivatives thereof includes an acrylic acid, a methyl acrylate, a methacrylic acid, a maleic acid or anhydride, a fumaric acid, an itaconic acid or anhydride or mixtures thereof.

Suitable examples of the carboxylic monomer include itaconic anhydride, maleic anhydride, methyl maleic anhydride, ethyl maleic anhydride, dimethyl maleic anhydride or mixtures thereof.

In one embodiment the carboxylic monomer comprises maleic anhydride or derivatives thereof.

In one embodiment the functionalised polyolefin may be grafted with a carboxylic monomer (typically the carboxylic monomer is maleic anhydride, maleic acid, (meth)acrylic acid, itaconic anhydride or itaconic acid). The polyolefin may be derived from an ethylene monomer and at least one other comonomer derived from an alpha-olefin having the formula $H_2C=CHR^1$, wherein $R^1$ is a hydrocarbyl group (for example an alkyl radical containing 1 to 18, or 1 to 10, or 1 to 6, or 1 to 3 carbon atoms). The hydrocarbyl group includes an alkyl radical that has a straight chain, a branched chain or mixtures thereof. Examples of a comonomer include propylene, 1-butene, 1-hexene, 1-octene, 4-methyl-1-pentene, 1-decene or mixtures thereof. In one embodiment the comonomer includes 1-butene, propylene or mixtures thereof. Examples of the olefin copolymers include ethylene-propylene copolymers, ethylene-1-butene copolymers or mixtures thereof.

In another embodiment the alpha-olefin comonomer may contain a number of carbon atoms in ranges of 6 to 40, or 10 to 34, or 14 to 22. Examples of an alpha-olefin include 1-decene, 1-undecene, 1-dodecene, 1-tridecene, 1-tetradecene, 1-pentadecene, 1-hexadecene, 1-heptadecene 1-octadecene, 1-nonadecene, 1-eicosene, 1-doeicosene, 2-tetracosene, 3-methyl-1-henicosene, 4-ethyl-2-tetracosene or mixtures thereof. Useful examples of an alpha-olefin include 1-pentadecene, 1-hexadecene, 1-heptadecene, 1-octadecene, 1-nonadecene or mixtures thereof. The alpha-olefin is often commercially available as mixtures especially as $C_{16}$-$C_{18}$.

In one embodiment the polymer with pendant groups may be a copolymer of an α-olefin and an unsaturated di-acid or an anhydride thereof. A more detailed description of suitable copolymer of an (i) αolefin and (ii) a di-acid or an anhydride thereof is given in U.S. Pat. Nos. 6,419,714 and/or 4,526,950.

In one embodiment the polymer with pendant groups may be derived from monomers comprising: (i) a vinyl aromatic monomer; and (ii) a carboxylic monomer, prior to esterification may be referred to as an interpolymer.

Examples of a vinyl aromatic monomer include styrene (also referred to as ethenylbenzene), substituted styrene or mixtures thereof. Examples of a suitable substituted styrene include alpha-methylstyrene, para-methylstyrene (also referred to as vinyl toluene), para-tert-butylstyrene, alpha-ethylstyrene or mixtures thereof.

The molecular weight of the interpolymer may also be expressed in terms of the "reduced specific viscosity" of the polymer which is recognized means of expressing the molecular size of a polymeric substance. As used herein, the reduced specific viscosity (abbreviated as RSV) is the value obtained in accordance with the formula RSV=(Relative Viscosity−1)/Concentration, wherein the relative viscosity is determined by measuring, by means of a dilution viscometer, the viscosity of a solution of 1 g of the polymer in 10 $cm^3$ of acetone and the viscosity of acetone at 30° C. For purpose of computation by the above formula, the concentration is adjusted to 0.4 g of the interpolymer per 10 $cm^3$ of acetone. A more detailed discussion of the reduced specific viscosity, also known as the specific viscosity, as well as its relationship to the average molecular weight of an interpolymer, appears in Paul J. Flory, *Principles of Polymer Chemistry*, (1953 Edition) pages 308 et seq. The interpolymer polymer of the invention typically has a RSV from 0.05 to 2, in one embodiment 0.06 to 1, and in another embodiment 0.06 to 0.8. In one embodiment the RSV is 0.69. In another embodiment the RSV is 0.12. In one embodiment the Mw of the interpolymer is 10,000 to 300,000.

In one embodiment the polymer with pendant groups is an esterified styrene-maleic anhydride copolymer, wherein the anhydride units of the copolymer may be subsequently esterified with a branched alcohol that forms the branched hydrocarbyl groups as represented within $(\ )_y$ of the formula above.

In one embodiment the polymer with pendant groups further comprises a nitrogen containing group. The nitrogen containing group may be derived from a nitrogen containing compound capable of reacting with a functionalised polymer backbone. In one embodiment the nitrogen containing compound is further attached to the polymer through an amide functionality. The polymer with a nitrogen containing group may also be referred to as a dispersant viscosity modifier (or DVM).

In one embodiment the nitrogen containing compound comprises a nitrogen containing monomer. In one embodiment the nitrogen containing monomer is attached onto the polymer chain either by free radical grafting or copolymerisation. The nitrogen containing monomer may comprise a (meth)acrylamide or a nitrogen containing (meth)acrylate monomer. Typically the nitrogen containing compound comprising a (meth)acrylamide or nitrogen containing (meth)acrylate monomer is suitable for functionalizing the backbone of a polymer with pendant groups. The polymer with pendant groups (ii), may be prepared by condensing a portion or all of the unsaturated carboxylic acid or derivatives thereof with the nitrogen containing compound. The (meth)acrylamide or the nitrogen containing (meth)acrylate monomer may be represented by the formula:

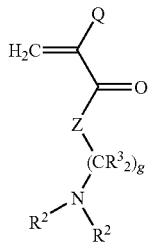

wherein
Q is hydrogen or methyl and, in one embodiment, Q is methyl;
Z is a N—H group or O (oxygen);
each $R^2$ is independently hydrogen or hydrocarbyl group containing 1 to 8 or 1 to 4 carbon atoms;
each $R^3$ is independently hydrogen or hydrocarbyl group containing 1 to 2 carbon atoms and, in one embodiment, each $R^3$ is hydrogen; and
g is an integer from 1 to 6 and, in one embodiment, g is 1 to 3.

Examples of a suitable nitrogen containing monomer include N,N-dimethylacrylamide, N-vinyl carbonamides (such as N-vinyl-formamide, N-vinylacetoamide, N-vinyl-n-propionamides, N-vinyl hydroxyacetoamide), vinyl pyridine, N-vinyl imidazole, N-vinyl pyrrolidinone, N-vinyl caprolactam, dimethylaminoethyl acrylate, dimethylaminoethyl methacrylate, dimethylaminobutylacrylamide, dimethylaminopropyl methacrylate, dimethylaminopropylacrylamide, dimethylaminopropylmethacrylamide, dimethylaminoethylacrylamide or mixtures thereof.

For a functionalised polyolefin and/or the polymer with pendant groups derived from monomers comprising: (i) a vinyl aromatic monomer; and (ii) a carboxylic monomer, the nitrogen containing compound includes a non-monomeric amine such as a monoamine, a polyamine or mixtures thereof. The amine includes primary functionality, secondary functionality or mixtures thereof. The non-monomeric amine includes cyclic, linear or branched and examples include an alkylamine, a hydroxy-substituted hydrocarbyl amine, a heterocyclic monoamine, an alkylenepolyamine, an aromatic amine or polyamine, a heterocyclic polyamine or mixtures thereof. In one embodiment the amine contains not more than one primary or secondary amino group, for example N,N-dimethylaminopropylamine. In one embodiment the nitrogen containing monomer comprises a non-monomeric amine. (By "non-monomeric" is meant that the amine is not normally capable of polymerising to form a polymer by virtue of the presence of, e.g., olefinic unsaturation.)

In one embodiment the amine may be a hydroxy-substituted hydrocarbyl amine such as a hydroxyalkyl amine. Examples of a suitable hydroxy-substituted hydrocarbyl amine include aminoethyl ethanolamine, aminopropyl ethanolamine, aminobutyl ethanolamine or mixtures thereof.

Suitable cyclic amines include 4-aminodiphenylamine, 4-(3-aminopropyl)morpholine, 4-(2-aminoethyl)morpholine or mixtures thereof. In one embodiment the cyclic amine is 4-(3-aminopropyl)morpholine or mixtures thereof. Other amines that may be suitable are described below in connection with phosphorus amine salts.

Oils of Lubricating Viscosity

The lubricating composition comprises an oil of lubricating viscosity. Such oils include natural and synthetic oils, oil derived from hydrocracking, hydrogenation, and hydrofinishing, unrefined, refined and re-refined oils and mixtures thereof.

Unrefined oils are those obtained directly from a natural or synthetic source generally without (or with little) further purification treatment.

Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils, and are obtained by processes similar to those used to obtain refined oils and often are additionally processed by techniques directed to removal of spent additives and oil breakdown products.

Natural oils useful in making the inventive lubricants include animal oils or vegetable oils (e.g., castor oil or lard oil), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

Synthetic lubricating oils are useful and include hydrocarbon oils such as polymerised and interpolymerised olefins (e.g., polybutylenes, polypropylenes, propyleneisobutylene copolymers); poly(1-hexenes), poly(1-octenes), poly(1-decenes), and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); alkylated diphenyl ethers and alkylated diphenyl sulphides and the derivatives, analogs and homologs thereof or mixtures thereof.

Other synthetic lubricating oils include polyol esters (such as Prolube® 3970), diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerised Fischer-Tropsch hydrocarbons or waxes. In one embodiment oils may be prepared by a Fischer-Tropsch gas-to-liquid synthetic procedure as well as other gas-to-liquid oils.

Oils of lubricating viscosity may also be defined as specified in the American Petroleum Institute (API) Base Oil Interchangeability Guidelines. The five base oil groups are as follows: Group I (sulphur content >0.03 wt %, and/or <90 wt % saturates, viscosity index 80-120); Group II (sulphur content ≦0.03 wt %, and ≧90 wt % saturates, viscosity index 80-120); Group III (sulphur content ≦0.03 wt %, and ≧90 wt % saturates, viscosity index ≧120); Group IV (all polyalphaolefins (PAOs)); and Group V (all others not included in Groups I, II, III, or IV). The oil of lubricating viscosity comprises an API Group I, Group II, Group III, Group IV, Group V oil or mixtures thereof. Often the oil of lubricating viscosity is an API Group I, Group II, Group III, Group IV oil or mixtures thereof. Alternatively the oil of lubricating viscosity is often an API Group I, Group II, Group III oil or mixtures thereof.

The lubricating composition may be in the form of a concentrate and/or a fully formulated lubricant. If the polymer with pendant groups of the present invention is in the form of a concentrate (which may be combined with additional oil to form, in whole or in part, a finished lubricant), the ratio of the polymer with pendant groups to the oil of lubricating viscosity and/or to diluent oil include the ranges of 1:99 to 99:1 by weight, or from 80:20 to 10:90 by weight.

Other Performance Additives

The lubricant composition optionally comprises other performance additives. The other performance additives comprise at least one of metal deactivators, conventional detergents (detergents prepared by conventional processes known in the art), dispersants, viscosity modifiers, friction modifiers, corrosion inhibitors, dispersant viscosity modifiers, extreme pressure agents, antiscuffing agents, antioxidants, foam inhibitors, demulsifiers, pour point depressants, seal swelling agents and mixtures thereof. Typically, fully-formulated lubricating oil will contain one or more of these performance additives.

Dispersants

Dispersants are often known as ashless-type dispersants because, prior to mixing in a lubricating oil composition, they do not contain ash-forming metals and they do not normally contribute any ash forming metals when added to a lubricant and polymeric dispersants. Ashless type dispersants are characterised by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with number average molecular weight of the polyisobutylene substituent in the range 350 to 5000, or 500 to 3000.

In one embodiment the invention further comprises at least one dispersant derived from polyisobutylene, an amine and zinc oxide to form a polyisobutylene succinimide complex with zinc. The polyisobutylene succinimide complex with zinc may be used alone or in combination.

Another class of ashless dispersant is Mannich bases. Mannich dispersants are the reaction products of alkyl phenols with aldehydes (especially formaldehyde) and amines (especially polyalkylene polyamines). The alkyl group typically contains at least 30 carbon atoms.

The dispersants may also be post-treated by conventional methods by a reaction with any of a variety of agents. Among these are boron compounds (such as boric acid), urea, thiourea, dimercaptothiadiazoles, carbon disulphide, aldehydes, ketones, carboxylic acids, hydrocarbon-substituted succinic anhydrides, maleic anhydride, nitriles, epoxides, and phosphorus compounds.

Detergents

The lubricant composition optionally further comprises known neutral or overbased detergents i.e. ones prepared by conventional processes known in the art. Suitable detergent substrates include, phenates, sulphur containing phenates, sulphonates, salixarates, salicylates, carboxylic acid, phosphorus acid, alkyl phenol, sulphur coupled alkyl phenol compounds, or saligenins.

Antioxidant

Antioxidant compounds are known and include sulphurised olefins, diphenylamines, hindered phenols, molybdenum dithiocarbamates, and mixtures thereof. Antioxidant compounds may be used alone or in combination.

The hindered phenol antioxidant often contains a secondary butyl and/or a tertiary butyl group as a sterically hindering group. The phenol group is often further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant is an ester and may include, e.g., Irganox™ L-135 from Ciba. Suitable examples of molybdenum dithiocarbamates which may be used as an antioxidant include commercial materials sold under the trade names such as Vanlube 822™ and Molyvan™ A from R. T. Vanderbilt Co., Ltd., and Adeka Sakura-Lube™ S-100, S-165 and S-600 from Asahi Denka Kogyo K. K and mixtures thereof.

Viscosity Modifiers

Viscosity modifiers other than the polymer with pendant groups of the present invention, include styrene-butadiene rubbers, ethylene-propylene copolymers, hydrogenated styrene-isoprene polymers, hydrogenated diene polymers, polyalkyl styrenes, polyolefins, polyalkyl (meth)acrylates and esters of maleic anhydride-styrene copolymers, or mixtures thereof. In one embodiment the polymeric thickener is a poly(meth)acrylate.

Antiwear Agent

The lubricating composition optionally further comprises at least one antiwear agent. Examples of suitable antiwear agents include oil soluble phosphorus amine salts, sulphurised olefins, metal dihydrocarbyldithiophosphates (such as zinc dialkyldithiophosphates), thiocarbamate-containing compounds, such as thiocarbamate esters, thiocarbamate amides, thiocarbamic ethers, alkylene-coupled thiocarbamates, and bis(S-alkyldithiocarbamyl) disulphides.

In one embodiment the oil soluble phosphorus amine salt antiwear agent comprises an amine salt of a phosphorus acid ester or mixtures thereof. The amine salt of a phosphorus acid ester includes phosphoric acid esters and amine salts thereof; dialkyldithiophosphoric acid esters and amine salts thereof; amine salts of phosphites; and amine salts of phosphorus-containing carboxylic esters, ethers, and amides; and mixtures thereof. The amine salt of a phosphorus acid ester may be used alone or in combination.

In one embodiment the oil soluble phosphorus amine salt comprises partial amine salt-partial metal salt compounds or mixtures thereof. In one embodiment the phosphorus compound further comprises a sulfur atom in the molecule. In one embodiment the amine salt of the phosphorus compound is ashless, i.e., metal-free (prior to being mixed with other components).

The amines which may be suitable for use as the amine salt include primary amines, secondary amines, tertiary amines, and mixtures thereof. The amines include those with at least one hydrocarbyl group, or, in certain embodiments, two or three hydrocarbyl groups. The hydrocarbyl groups may contain 2 to 30 carbon atoms, or in another embodiment 8 to 26 or 10 to 20 or 13 to 19 carbon atoms.

Primary amines include ethylamine, propylamine, butylamine, 2-ethylhexylamine, octylamine, and dodecylamine, as well as such fatty amines as n-octylamine, n-decylamine, n-dodecylamine, n-tetradecylamine, n-hexadecylamine, n-octadecylamine and oleyamine. Other useful fatty amines include commercially available fatty amines such as "Armeen®" amines (products available from Akzo Chemicals, Chicago, Ill.), such as Armeen C, Armeen O, Armeen OL, Armeen T, Armeen HT, Armeen S and Armeen SD, wherein the letter designation relates to the fatty group, such as coco, oleyl, tallow, or stearyl groups.

Examples of suitable secondary amines include dimethylamine, diethylamine, dipropylamine, dibutylamine, diamylamine, dihexylamine, diheptylamine, methylethylamine, ethylbutylamine and ethylamylamine. The secondary amines may be cyclic amines such as piperidine, piperazine and morpholine.

The amine may also be a tertiary-aliphatic primary amine. The aliphatic group in this case may be an alkyl group containing 2 to 30, or 6 to 26, or 8 to 24 carbon atoms. Tertiary alkyl amines include monoamines such as tert-butylamine, tert-hexylamine, 1-methyl-1-amino-cyclohexane, tert-octylamine, tert-decylamine, tertdodecylamine, tert-tetradecylamine, tert-hexadecylamine, tert-octadecylamine, tert-tetracosanylamine, and tert-octacosanylamine.

In one embodiment the phosphorus acid amine salt comprises an amine with C11 to C14 tertiary alkyl primary groups or mixtures thereof. In one embodiment the phosphorus acid amine salt comprises an amine with C14 to C18 tertiary alkyl primary amines or mixtures thereof. In one embodiment the phosphorus acid amine salt comprises an amine with C18 to C22 tertiary alkyl primary amines or mixtures thereof.

Mixtures of amines may also be used in the invention. In one embodiment a useful mixture of amines is "Primene® 81R" and "Primene® JMT." Primene® 81R and Primene® JMT (both produced and sold by Rohm & Haas) are mixtures of C11 to C14 tertiary alkyl primary amines and C18 to C22 tertiary alkyl primary amines respectively.

In one embodiment the hydrocarbyl amine salt of an alkylphosphoric acid ester is the reaction product of a C14 to C18 alkylated phosphoric acid with Primene 81R™ (produced and sold by Rohm & Haas) which is a mixture of C11 to C14 tertiary alkyl primary amines.

Examples of hydrocarbyl amine salts of dialkyldithiophosphoric acid esters include the reaction product(s) of isopropyl, methyl-amyl (4-methyl-2-pentyl or mixtures thereof), 2-ethylhexyl, heptyl, octyl or nonyl dithiophosphoric acids with ethylene diamine, morpholine, or Primene 81R™, and mixtures thereof.

In one embodiment the dithiophosphoric acid may be reacted with an epoxide or a glycol. This reaction product is further reacted with a phosphorus acid, anhydride, or lower ester. The epoxide includes an aliphatic epoxide or a styrene oxide. Examples of useful epoxides include ethylene oxide, propylene oxide, butene oxide, octene oxide, dodecene oxide, styrene oxide and the like. In one embodiment the epoxide is propylene oxide. The glycols may be aliphatic glycols having from 1 to 12, or from 2 to 6, or 2 to 3 carbon atoms. The dithiophosphoric acids, glycols, epoxides, inorganic phosphorus reagents and methods of reacting the same are described in U.S. Pat. Nos. 3,197,405 and 3,544,465. The resulting acids may then be salted with amines. An example of suitable dithiophosphoric acid is prepared by adding phosphorus pentoxide (about 64 grams) at 58° C. over a period of 45 minutes to 514 grams of hydroxypropyl O,O-di(4-methyl-2-pentyl)phosphorodithioate (prepared by reacting di(4-methyl-2-pentyl)-phosphorodithioic acid with 1.3 moles of propylene oxide at 25° C.). The mixture is heated at 75° C. for 2.5 hours, mixed with a diatomaceous earth and filtered at 70° C. The filtrate contains 11.8% by weight phosphorus, 15.2% by weight sulfur, and an acid number of 87 (bromophenol blue).

The dithiocarbamate-containing compounds may be prepared by reacting a dithiocarbamate acid or salt with an unsaturated compound. The dithiocarbamate containing compounds may also be prepared by simultaneously reacting an amine, carbon disulphide and an unsaturated compound. Generally, the reaction occurs at a temperature from 25° C. to 125° C.

Examples of suitable olefins that may be sulphurised to form an the sulphurised olefin include propylene, butylene, isobutylene, pentene, hexane, heptene, octane, nonene, decene, undecene, dodecene, undecyl, tridecene, tetradecene, pentadecene, hexadecene, heptadecene, octadecene, octadecenene, nonodecene, eicosene or mixtures thereof. In one embodiment, hexadecene, heptadecene, octadecene, octadecenene, nonodecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulphurised olefin includes fatty acids and their esters. The fatty acids are often obtained from vegetable oil or animal oil; and typically contain 4 to 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. In one embodiment fatty acids and/or ester are mixed with olefins.

In an alternative embodiment, the ashless antiwear agent may be a monoester of a polyol and an aliphatic carboxylic acid, often an acid containing 12 to 24 carbon atoms. Often the monoester of a polyol and an aliphatic carboxylic acid is in the form of a mixture with a sunflower oil or the like, which may be present in the friction modifier mixture from 5 to 95, in several embodiments from 10 to 90, or from 20 to 85, or 20 to 80 weight percent of said mixture. The aliphatic carboxylic acids (especially a monocarboxylic acid) which form the esters are those acids typically containing 12 to 24, or from 14 to carbon atoms. Examples of carboxylic acids include dodecanoic acid, stearic acid, lauric acid, behenic acid, and oleic acid.

Polyols include diols, triols, and alcohols with higher numbers of alcoholic OH groups. Polyhydric alcohols include ethylene glycols, including di-, tri- and tetraethylene glycols; propylene glycols, including di-, tri- and tetrapropylene glycols; glycerol; butane diol; hexane diol; sorbitol; arabitol; mannitol; sucrose; fructose; glucose; cyclohexane diol; erythritol; and pentaerythritols, including di- and tripentaerythritol. Often the polyol is diethylene glycol, triethylene glycol, glycerol, sorbitol, pentaerythritol or dipentaerythritol.

The commercially available monoester known as "glycerol monooleate" is believed to include 60±5 percent by weight of the chemical species glycerol monooleate, along with 35±5 percent glycerol dioleate, and less than 5 percent trioleate and oleic acid. The amounts of the monoesters, described above, are calculated based on the actual, corrected, amount of polyol monoester present in any such mixture.

Antiscuffing Agent

The lubricant composition may also contain an antiscuffing agent. Antiscuffing agent compounds are believed to decrease adhesive wear are often sulphur containing compounds. Typically the sulphur containing compounds include sulphurised olefins, organic sulphides and polysulphides, such as dibenzyldisulphide, bis-(chlorobenzyl) disulphide, dibutyl tetrasulphide, di-tertiary butyl polysulphide, sulphurised methyl ester of oleic acid, sulphurised alkylphenol, sulphurised dipentene, sulphurised terpene, sulphurised Diels-Alder adducts, alkyl sulphenyl N'N-dialkyl dithiocarbamates, the reaction product of polyamines with polybasic acid esters, chlorobutyl esters of 2,3-dibromopropoxyisobutyric acid, acetoxymethyl esters of dialkyl dithiocarbamic acid and acyloxyalkyl ethers of xanthogenic acids and mixtures thereof.

Extreme Pressure Agents

Extreme Pressure (EP) agents that are soluble in the oil include sulphur- and chlorosulphur-containing EP agents, chlorinated hydrocarbon EP agents and phosphorus EP agents. Examples of such EP agents include chlorinated wax; sulphurised olefins (such as sulphurised isobutylene), organic sulphides and polysulphides such as dibenzyldisulphide, bis-(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons such as the reaction product of phosphorus sulphide with turpentine or methyl oleate; phosphorus esters such as the dihydrocarbon and trihydrocarbon phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid; amine salts of alkyl and dialkylphosphoric acids or derivatives including, for example, the amine salt of a reaction product of a dialkyldithiophosphoric acid with propylene oxide and subsequently followed by a further reaction with $P_2O_5$; and mixtures thereof (as described in U.S. Pat. No. 3,197,405).

Other performance additives such as corrosion inhibitors including octylamine octanoate, condensation products of dodecenyl succinic acid or anhydride and a fatty acid such as oleic acid with a polyamine; metal deactivators including derivatives of benzotriazoles, dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, poly(meth)acrylates, polyacrylates or polyacrylamides; and friction modifiers including fatty acid derivatives such as amines, esters, epoxides, fatty imidazolines, condensation products of carboxylic acids and polyalkylene-polyamines and amine salts of alkylphosphoric acids may also be used in the lubricant composition.

Industrial Application

The method and lubricating composition of the invention may be suitable for gear oils, axle oils, drive shaft oils, traction oils, manual transmission oils, automatic transmission oils, working fluids, hydraulic oils, or internal combustion engine oils.

In one embodiment the method and lubricating composition of the invention may be suitable for at least one of gear oils, axle oils, drive shaft oils, traction oils, manual transmission oils or automatic transmission oils.

The method and lubricating compositions are capable of providing at least one (or at least two, or all) of acceptable/improved shear stability, acceptable/improved viscosity index control and acceptable/improved low temperature viscosity.

When the polymer with pendant groups further comprises a nitrogen containing compound, the polymer may be further have acceptable/improved dispersancy properties.

The internal combustion engine may be a 2-stroke or 4-stroke engine. Suitable internal combustion engines include a marine diesel engine, aviation piston engines, low-load diesel engines, automobile and truck engines.

In several embodiments a suitable lubricating composition comprises the polymer with pendant groups present on an actives basis in ranges as shown in Table 1.

TABLE 1

| | Embodiments (wt % of lubricant composition) | | | |
|---|---|---|---|---|
| | A | B | C | D |
| Polymer with Pendant groups | 0.01-79.9 | 0.1-70 | 1-70 | 1.5-65 |
| Other Performance Additives | 0-20 | 0.01-15 | 0.5-20 | 0.5-15 |
| Oil of Lubricating Viscosity | 0.01-99.99 | 10-99.89 | 10-99.4 | 20-98 |

The following examples provide an illustration of the invention. These examples are non exhaustive and are not intended to limit the scope of the invention.

EXAMPLES

Preparation of the Polymer

Preparative Example 1 (Prep 1) A polymer is prepared by charging a mixing vessel with 412.5 g of 2-decyl tetradecyl methacrylate, 105 g of a Hydroseal™ mineral oil, 6.9 g of Trigonox®-21 (t-butyl peroctoate) and 6.9 g of n-dodecyl mercaptan and stirred. Approximately one-third of the mixture is then charged into a reaction vessel equipped with a mechanical overhead stirrer, water-cooled condenser, thermocouple, addition funnel and a nitrogen inlet. The vessel further contains 7.56 g of dimethylaminopropyl methacrylamide. The contents of the reaction vessel are stirred for 20 minutes under a nitrogen atmosphere (flow rate 28.3 L/hr). The nitrogen flow is then reduced to 14.2 L/hr and the mixture is set to be heated to 110° C. After 15 minutes, the reaction exotherm increases the temperature to 125° C., and the remaining contents of the mixing vessel are added to the reaction vessel over a period of 90 minutes through the addition funnel, one hour later, another 0.72 g of Trigonox®-21 and 2.55 g of Hydroseal™ mineral oil are added, before stirring for one hour. The product is cooled and analysed. The polymer formed contains 98.2 wt % of 2-decyl tetradecyl methacrylate units, and 1.8 wt % of dimethylaminopropyl methacrylamide units. The number average molecular weight is 8567, and weight average molecular weight is 13,479.

Preparative Example 2 (Prep 2) employs a similar experimental procedure to Preparative Example 1, except the oil is a Group III base oil, and the polymer formed has a number average molecular weight of 8500, and weight average molecular weight of 13,500.

Comparative Example 1 (Compar 1) is prepared in a similar procedure to Preparative Example 1, except the methacrylate of the Comparative Example 1 is 68.2 wt % of $C_{12-15}$ alkyl methacrylate, 30 wt % 2-ethylhexyl methacrylate and 1.8 wt % dimethylaminopropyl methacrylamide. The product formed has a number average molecular weight of 8500, and weight average molecular weight of 14,300.

Comparative Example 2 (Compar 2) is prepared in a similar procedure to Preparative Example 2, except the polymer of the Comparative Example 2 is 49.1 wt % of $C_{12-15}$ alkyl methacrylate, 49.1 wt % 2-decyl tetradecyl methacrylate and 1.8 wt % dimethylaminopropyl methacrylamide. The product formed has a number average molecular weight of 8700, and weight average molecular weight of 14,100.

Comparative Example 3 (Compar 3) is prepared in a similar procedure to Preparative Example 2, except the polymer of the Comparative Example 2A is 98.2 wt % of tetradecyl methacrylate and 1.8 wt % dimethylaminopropyl methacrylamide. The product formed has a number average molecular weight of 10,500, and weight average molecular weight of 17,800.

Preparative Example 3 (Prep 3) employs a similar experimental procedure to Preparative Example 1, except the monomers are changed to prepare a polymer with a composition of 5 wt % methyl methacrylate, 93.2 wt % 2-decyl tetradecyl methacrylate and 1.8 wt % dimethylaminopropyl methacrylamide. The product formed has a number average molecular weight of 9100, and weight average molecular weight of 14,500.

Comparative Example 4 (Compar 4) is prepared by a similar experimental procedure as Preparative Example 3, except the polymer formed has a composition containing 20 wt % methyl methacrylate, 78.2 wt % 2-decyl tetradecyl methacrylate and 1.8 wt % dimethylaminopropyl methacrylamide. The product formed has a number average molecular weight of 9000, and weight average molecular weight of 18,000.

Preparative Example 4 (Prep 4) is prepared by adding 490 g of maleic anhydride and 7.5 kg of toluene into a vessel (equipped with two addition funnels) and heating to 65° C. to substantially dissolve the maleic anhydride. The vessel is the heated to 106° C. Then 36.9 g of benzoyl peroxide (dissolved in 500 g of toluene) and 500 g of styrene are added over a period of 90 minutes to the vessel from the two addition funnels. The contents of the vessel are then stirred for one hour at 106° C. The product formed is a maleic anhydride styrene copolymer resin with a RSV of 0.07.

About 23 kg of the maleic anhydride styrene copolymer resin with a RSV of 0.07 is added to a vessel equipped with a reflux condenser and a nitrogen inlet, thermo-well and a stirring rod. To the vessel are added 768.2 g of 2-decyltetradecanol (Isofol® 24) and 1438.2 g of Neodol® 25 (a mixture of linear $C_{12-15}$ alcohols commercially available from Shell). The vessel is then heated with refluxing to 135° C. for 20 hours. 47.5 g of methanesulphonic acid is added and refluxing is continued for 20 hours, before adding an equivalent amount of sodium hydroxide to neutralize the methanesulphonic acid. The vessel is then heated to 150° C. and vacuum stripped and the resultant product is then filtered. The weight average molecular weight is 21,000.

Preparative Example 5 (Prep 5) is prepared in a similar experimental procedure as Preparative Example 4, except the alcohol used to prepare the ester groups is 100 mole % (6683.34 g) Isofol®24. The weight average molecular weight is 18500.

Comparative Example 5 (Compar 5) is prepared in a similar experimental procedure as Preparative Example 4, except the alcohols used to prepare the ester groups are 50 mole % (566.37 g) 2-ethylhexanol and 50 mole % (961.35 g) Neodol®25.

Lubricating Compositions containing the polymers of Preparative Examples 1-5 and Comparative Examples 1-5 are prepared by blending into a mixture of Group IV base oil (about 25 wt % of the base oil) and Group III base oil (about 75 wt % of the base oil). The lubricating compositions further contain wt % of an additive package. The lubricating compositions are then tested by measuring the kinematic viscosity using ASTM D2270 (KV100); and Brookfield low temperature performance using ASTM D2986 at −40° C. (BV40).

The lubricating compositions are also subjected to shear as determined by KRL tapered bearing shear stability test. The instrument is run for 20 hours with 5000 N load, at 140° C. and at 1450 rpm. The viscosity data (VI) obtained from the test is described in ASTM method D445.

The results obtained for all three tests are presented in Table 2.

TABLE 2

| Lubricating Composition | Polymer | Polymer Treat Rate (wt %) | BV-40 (1000's) | KV100 | VI |
|---|---|---|---|---|---|
| 1 | Prep 1 | 52.5 | 118 | 22.43 | 189 |
| 2 | Prep 2 | 64.1 | 85 | 24.99 | 204 |
| LCCOMP 1 | Compar 1 | 50 | 188 | 22 | 177 |
| LCCOMP 2 | Compar 2 | 49.8 | 368 | 21.03 | 181 |
| LCCOMP 3 | Compar 3 | 40.4 | Solid | 20.49 | 186 |
| 3 | Prep 3 | 25 | 13.2 | 7.66 | 185 |
| 4 | Prep 4 | 51.3 | 168 | 22.82 | 184 |
| LCCOMP 4 | Compar 4 | 41.9 | 256 | 21.12 | 175 |
| 5 | Prep 5 | 25 | 81 | 9.5 | 187 |
| LCCOMP 5 | Compar 5 | 25 | Solid | 9.4 | 151 |

A further set of lubricating compositions are prepared in a Group IV base oil containing the polymers of Preparative Example 4 and 5 and Comparative Example 5. The results obtained are presented in Table 3.

TABLE 3

| Lubricating Composition | Polymer | Polymer Treat Rate (wt %) | BV-40 (1000's) | KV100 | VI |
|---|---|---|---|---|---|
| 6 | Prep 4 | 25 | 9.52 | 8.63 | 182 |
| 7 | Prep 5 | 25 | 8.32 | 8.80 | 192 |
| LCCOMP 6 | Compar 5 | 25 | Solid | 8.7 | 154 |

The data demonstrates that the polymers of the invention are capable of providing at least one (or at least two, or all) of acceptable/improved shear stability, least of acceptable/improved viscosity index control and least of acceptable/improved low temperature viscosity, compared with the Comparative Examples outside the scope of the present invention.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration. As used herein any member of a genus (or list) may be excluded from the claims.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

a. hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

b. substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

c. hetero substituents, that is, substituents which, while having a predominantly hydrocarbon character, in the context of this invention, contain other than carbon in a ring or chain otherwise composed of carbon atoms; and d. heteroatoms include sulphur, oxygen, nitrogen, and encompass substituents as pyridyl, furyl, thienyl and imidazolyl. In general, no more than two, in one aspect no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polymer of Formula (I), wherein the polymer has pendant groups as represented within $(\ )_w$ of the formula:

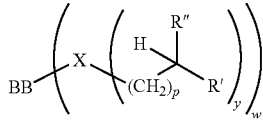

Formula (I)

wherein
BB is a polymer backbone wherein the polymer comprises at least one of (a) a polymer derived from monomers comprising: (i) a vinyl aromatic monomer and (ii) a carboxylic monomer or derivatives thereof; (b) a copolymer derived from (i) an α-olefin and (ii) a carboxylic monomer or derivatives thereof; or (c) mixtures thereof;
X is a functional group which either (i) contains at least a carbon and at least one oxygen or nitrogen atom or (ii) is an alkylene group with 1 to 5 carbon atoms, connecting the polymer backbone and a branched hydrocarbyl group contained within $(\ )_y$;
w is the number of pendant groups attached to the polymer backbone ranging from 1 to 2000;
y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal or ammonium cation, and mixtures thereof;
p is an integer in the range of 1 to 15;
R' and R" are independently linear or branched hydrocarbyl groups, and the combined total number of carbon atoms present in R' and R" is at least 12, wherein the polymer has 20% to 100% branched hydrocarbyl groups R' and R".

2. The polymer of claim 1 wherein X is a functional group containing a carbon and at least one oxygen or nitrogen atom.

3. The polymer of claim 1, having a weight average molecular weight in the range of 1000 to 2,000,000.

4. The polymer of claim 1, wherein the functional group X is an ester, an amide or an imide.

5. The polymer of claim 1 having the total combined number of carbon atoms on R' and R" in the range of 12 to 60.

6. The polymer of claim 1, wherein the polymer with pendant groups is derived from monomers comprising: (i) a vinyl aromatic monomer; and (ii) a carboxylic monomer, comprising an esterified styrene-maleic anhydride copolymer, wherein the maleic anhydride units of the copolymer are subsequently esterified with an alcohol with alkyl branched pendant groups.

7. The polymer of claim 1, wherein the polymer further comprises a nitrogen containing group.

8. The polymer of claim 7, wherein the nitrogen containing group is derived from a nitrogen containing compound capable of reacting with a functionalised polymer backbone.

9. The polymer of claim 8, wherein the nitrogen containing compound is further attached to the polymer through an amide functionality.

10. The polymer of claim 9, wherein the nitrogen containing compound comprises an alkylamine, a hydroxy-substituted hydrocarbyl amine, a heterocyclic monoamine, an alkylenepolyamine, an aromatic amine or polyamine, a heterocyclic polyamine or mixtures thereof.

11. The polymer of claim 9, wherein the nitrogen containing compound is derived from a nitrogen containing monomer.

12. A lubricating composition comprising an oil of lubricating viscosity and the polymer of claim 1.

13. A method of controlling the viscosity index of a lubricant, the method comprising supplying to the lubricant the polymer of claim 1.

14. The method of claim 13, wherein the lubricant is suitable for at least one of gear oils, axle oils, drive shaft oils, traction oils, manual transmission oils or automatic transmission oils.

15. A polymer of Formula (I), wherein the polymer has pendant groups as represented within $(\ )_w$ of the formula:

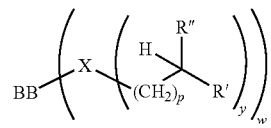

Formula (I)

wherein
BB is a polymer backbone wherein the polymer comprises at least one of (a) a polymer derived from monomers comprising: (i) a vinyl aromatic monomer; and (ii) a carboxylic monomer or derivatives thereof; (b) a copolymer derived from (i) an α-olefin and (ii) a carboxylic monomer or derivatives thereof; or (c) mixtures thereof;

X is a functional group which contains at least a carbon and at least one oxygen or nitrogen atom, connecting the polymer backbone and a branched hydrocarbyl group contained within $(\ )_y$;

w is the number of pendant groups attached to the polymer backbone in the range of 1 to 2000;

y is 0, 1, 2 or 3, provided that in at least 1 mol % of the pendant groups, y is not zero; and with the proviso that when y is 0, X is bonded to a terminal group in a manner sufficient to satisfy the valence of X, wherein the terminal group is selected from hydrogen, alkyl, aryl, a metal or ammonium cation, and mixtures thereof;

p is an integer in the range of 1 to 15;

R' and R" are independently linear or branched hydrocarbyl groups, and the combined total number of carbon atoms present in R' and R" is at least 12, wherein the polymer has 20% to 100% branched hydrocarbyl groups R' and R".

16. The polymer of claim 1, wherein the polymer contains 20% to 100% branched hydrocarbyl groups represented by a group within $(\ )_y$.

17. The polymer of claim 1, wherein the polymer contains 50% to 100% branched hydrocarbyl groups represented by a group within $(\ )_y$.

18. The polymer of claim 1, wherein the polymer contains 70% to 100% branched hydrocarbyl groups represented by a group within $(\ )_y$.

19. The polymer of claim 1, wherein p is an integer in the range of 1 to 8.

20. The polymer of claim 1, wherein p is an integer in the range of 1 to 4.

* * * * *